US010767861B2

(12) United States Patent
Axelbaum et al.

(10) Patent No.: US 10,767,861 B2
(45) Date of Patent: Sep. 8, 2020

(54) METHOD AND APPARATUS FOR CAPTURING CARBON DIOXIDE DURING COMBUSTION OF CARBON CONTAINING FUEL

(71) Applicants: Richard L. Axelbaum, St. Louis, MO (US); Benjamin M. Kumfer, St. Louis, MO (US); Fei Xia, St. Louis, MO (US); Akshay Gopan, Delhi (IN); Bhupesh Dhungel, St. Louis, MO (US)

(72) Inventors: Richard L. Axelbaum, St. Louis, MO (US); Benjamin M. Kumfer, St. Louis, MO (US); Fei Xia, St. Louis, MO (US); Akshay Gopan, Delhi (IN); Bhupesh Dhungel, St. Louis, MO (US)

(73) Assignee: Washington University, St. Louis, MO (US)

( * ) Notice: Subject to any disclaimer, the term of this patent is extended or adjusted under 35 U.S.C. 154(b) by 179 days.

(21) Appl. No.: 15/907,055

(22) Filed: Feb. 27, 2018

(65) Prior Publication Data

US 2018/0187887 A1 Jul. 5, 2018

Related U.S. Application Data

(63) Continuation of application No. 14/295,018, filed on Jun. 3, 2014, now Pat. No. 9,939,153.

(Continued)

(51) Int. Cl.
*F23B 10/00* (2011.01)
*F23L 7/00* (2006.01)
(Continued)

(52) U.S. Cl.
CPC .............. *F23L 7/007* (2013.01); *F22B 1/22* (2013.01); *F22B 31/04* (2013.01); *F22B 33/00* (2013.01);
(Continued)

(58) Field of Classification Search
CPC ... F23L 7/007; F23L 2900/07002; F22B 1/22; F22B 31/04; F22B 33/00; F22B 33/04;
(Continued)

(56) References Cited

U.S. PATENT DOCUMENTS 2,648,315 A 8/1953 Kunz
2,918,798 A * 12/1959 Gerhard ............... F22B 35/008
60/676

(Continued)

FOREIGN PATENT DOCUMENTS

CA 2812632 A1 4/2012

OTHER PUBLICATIONS

Gopan et al.,"Performance Analysis of a Staged Pressurized Oxyfuel Combustion (SPOC) Power Plant with Minimal Flue Gas Recycle", 2013 AIChE Annual Meeting, San Francisco, CA, Nov. 3-8, 2013, 2 pages.

(Continued)

*Primary Examiner* — Steven M Sutherland
(74) *Attorney, Agent, or Firm* — Armstrong Teasdale LLP

(57) ABSTRACT

A boiler system having a series of boilers. Each boiler includes a shell having an upstream end, a downstream end, and a hollow interior. The boilers also have an oxidizer inlet entering the hollow interior adjacent the upstream end of the shell and a fuel nozzle positioned adjacent the upstream end of the shell for introducing fuel into the hollow interior of the shell. Each boiler includes a flue duct connected to the shell adjacent the downstream end for transporting flue gas from the hollow interior. Oxygen is delivered to the oxidizer inlet of the first boiler in the series. Flue gas from the immediately preceding boiler in the series is delivered through the oxidizer inlet of each boiler subsequent to the first boiler in the series.

12 Claims, 4 Drawing Sheets

Related U.S. Application Data

(60) Provisional application No. 61/830,428, filed on Jun. 3, 2013.

(51) Int. Cl.

| | | |
|---|---|---|
| *F23J 15/02* | (2006.01) |
| *F22B 31/04* | (2006.01) |
| *F22B 33/18* | (2006.01) |
| *F22B 1/22* | (2006.01) |
| *F22B 33/00* | (2006.01) |
| *F22B 33/12* | (2006.01) |
| *F23C 6/00* | (2006.01) |
| *F23C 7/00* | (2006.01) |

(52) U.S. Cl.
CPC .............. *F22B 33/12* (2013.01); *F22B 33/18* (2013.01); *F23C 6/00* (2013.01); *F23C 7/00* (2013.01); *F23J 15/02* (2013.01); *F23J 2215/50* (2013.01); *F23J 2219/70* (2013.01); Y02E 20/344 (2013.01)

(58) Field of Classification Search
CPC .. F22B 33/22; F22B 33/18; F23C 6/00; F23C 7/00; F23C 2201/30; F23C 2201/301; F23J 15/02; F23J 15/00; F23J 2900/15081; F02C 6/00; F23B 10/00; F23G 16/165; F23G 2900/50001; F23G 7/06; F23G 5/16
See application file for complete search history.

(56) References Cited

U.S. PATENT DOCUMENTS

| | | | |
|---|---|---|---|
| 3,948,223 A | 4/1976 | Benson | |
| 4,145,178 A | 3/1979 | Egnell et al. | |
| 4,725,222 A | 2/1988 | Koch | |
| 6,203,314 B1 | 3/2001 | Philippe et al. | |
| 6,952,997 B2 | 10/2005 | Shimrony et al. | |
| 7,043,920 B2 | 5/2006 | Viteri et al. | |
| 7,398,652 B1 | 7/2008 | Kosvic et al. | |
| 7,867,322 B2 | 1/2011 | Gal | |
| 9,267,432 B2 | 2/2016 | Armstrong et al. | |
| 2001/0000863 A1 | 5/2001 | Marin et al. | |
| 2003/0097840 A1* | 5/2003 | Hsu | F23C 9/00 60/670 |
| 2007/0251435 A1 | 11/2007 | Fisher | |
| 2008/0175774 A1 | 7/2008 | Morrison et al. | |
| 2008/0236398 A1 | 10/2008 | Zhang et al. | |
| 2008/0276844 A1 | 11/2008 | Yamamoto et al. | |
| 2010/0077947 A1 | 4/2010 | Hack | |
| 2011/0300054 A1 | 12/2011 | Ciattaglia et al. | |
| 2013/0000319 A1 | 1/2013 | Graham | |
| 2013/0283851 A1 | 10/2013 | Higginbotham et al. | |

OTHER PUBLICATIONS

Kumfer et al., "CFD Simulation of Pressurized Staged Oxyfuel Combustion", 2012 AIChE Annual Meeting, Pittsburgh, PA, Oct. 28-Nov. 2, 2012, 4 pages.

Kumfer et al., "A Staged, Pressurized Oxy-Combustion System for Carbon Capture", 3rd Oxyfuel Combustion Conference, Ponferrada, Spain, Sep. 9-13, 2013, 20 pages.

Xia et al., "Staged, pressurized oxy-combustion: computational fluid dynamics simulations of a novel burner design", 2013 Fall Technical Meeting of the Eastern States Section of the Combustion Institute, Clemson University, SC, Oct. 13-16, 2013, pp. 1-7.

International Search Report and Written Opinion of corresponding application PCT/US2014/044976 dated Sep. 26, 2014, 12 pages.

* cited by examiner

METHOD AND APPARATUS FOR CAPTURING CARBON DIOXIDE DURING COMBUSTION OF CARBON CONTAINING FUEL

CROSS-REFERENCE TO RELATED APPLICATION

This Application is a continuation application of U.S. application Ser. No. 14/295,018, filed Jun. 3, 2014, which claims priority to U.S. Provisional Patent Application No. 61/830,428, filed Jun. 3, 2013, which are hereby incorporated by reference in their entireties.

GOVERNMENT RIGHTS

This invention was made with government support under grant # DE-FE0009702 awarded by the Department of Energy. The government has certain rights in the invention.

BACKGROUND

The present invention generally relates to power generation, and more particularly, to a method and apparatus for reducing carbon dioxide ($CO_2$) when generating power from carbon-based fuels.

Most power generation is provided by heating a working fluid, such as water to produce steam, and using the heated fluid to turn a turbine connected to a generator, which produces electricity. A boiler is typically used to heat the working fluid. Conventional boilers burn fuel such as coal, producing a flame that heats working fluid flowing through tubes extending through the boiler. The heat energy transferred to the working fluid turns the turbine, which turns the generator connected to the turbine. The working fluid cools as it passes through the turbine. Frequently, the working fluid is directed back through the tubes in the boiler where it is reheated and used again to turn the turbine. Because carbon-based fuels are inexpensive relative to other heat sources, they are frequently used in the boiler. One drawback of using carbon-based fuels is they produce harmful emissions such as $CO_2$ when they burn.

One way of reducing $CO_2$ emissions from carbon-based power generation is oxy-combustion, in which fuel is burning in an environment of oxygen and recycled flue gas to produce high purity $CO_2$. In the past, oxy-combustion has been performed at atmospheric pressure and recycled flue gas was regulated to control flame temperature and heat transfer rate in the boiler yielding conditions similar to conventional air-fired boilers. Conventional oxy-combustion is costly and inefficient due to a need to produce oxygen for the process, as well as, a need to compress and purify emitted $CO_2$ before use or disposal.

To reduce cost and increase efficiency associated with capturing and pressurizing $CO_2$, some have suggested burning the fuel in a pressurized atmosphere. Prior pressurized oxy-combustion systems have heated the working fluid with flue gas using a convective heat exchanger (e.g., heat recover steam generator). The tubes in the heat exchanger carrying the working fluid are separated from the burning fuel so the working fluid is not radiantly heated by the flame. In these systems, flue gas is recycled to cool the flue gas entering the heat exchanger to prevent damage to the tubes due to excess gas temperatures. Recycling flue gas results in losses in power plant efficiency. Prior systems required recycled flue gas or inert gas in practice to prevent the heat exchanger from exceeding safe operating temperatures.

Accordingly, there continues to be a need for an oxy-combustion system having increased efficiencies and lower operating costs.

SUMMARY

In one aspect, the present invention includes a boiler system. The system includes a series of boilers. Each boiler includes a generally cylindrical shell surrounding a vertical centerline. The shell defines an inner surface having an inner diameter and an inner length extending between an upper upstream end and a lower downstream end. The inner surface defines a hollow interior suitable for withstanding pressure greater than ambient. The interior has a pre-combustion zone, a combustion zone downstream from the pre-combustion zone, and a post-combustion zone downstream from the combustion zone. Each boiler includes an oxidizer inlet entering the pre-combustion zone of the hollow interior adjacent the upstream end of the shell. Each boiler also has a flow distributor mounted in the hollow interior of the shell downstream from oxidizer inlet adapted to provide oxidizer flowing downstream from the distributor with an even radial flow distribution, with an even circumferential flow distribution, and with a ratio of circular momentum to axial momentum of less than about 0.2. In addition, each boiler includes a fuel nozzle positioned adjacent the upstream end of the shell for introducing fuel into the combustion zone of the hollow interior of the shell along the centerline and downstream from the flow distributor. Further, each boiler has a flue duct connected to the shell adjacent the downstream end for transporting flue gas from the hollow interior. Oxygen is delivered to the first boiler in the series through the oxidizer inlet of the first boiler. Flue gas from the immediately preceding boiler in the series is delivered through the oxidizer inlet of each boiler subsequent to the first boiler in the series.

In another aspect, the present invention includes a boiler system having a series of boilers. Each of the boilers includes a shell having an upstream end, a downstream end opposite the upstream end, and a hollow interior. The boilers also have an oxidizer inlet entering the hollow interior adjacent the upstream end of the shell and a fuel nozzle positioned adjacent the upstream end of the shell for introducing fuel into the hollow interior of the shell. Each boiler has a flue duct connected to the shell adjacent the downstream end for transporting flue gas from the hollow interior. Oxygen is delivered to the oxidizer inlet of the first boiler in the series. Flue gas from the immediately preceding boiler in the series is delivered through the oxidizer inlet of each boiler subsequent to the first boiler in the series.

In still another aspect, the present invention includes a boiler having a generally cylindrical shell surrounding a vertical centerline. The shell defines an inner surface having an inner diameter and an inner length extending between an upper upstream end and a lower downstream end. The inner surface defines a hollow interior suitable for withstanding pressure greater than ambient. The interior has a pre-combustion zone, a combustion zone downstream from the pre-combustion zone, and a post-combustion zone downstream from the combustion zone. The boiler also includes an oxidizer inlet entering the pre-combustion zone of the hollow interior adjacent the upstream end of the shell. In addition, the boiler includes a flow distributor mounted in the hollow interior of the shell downstream from oxidizer inlet adapted to provide oxidizer flowing downstream from the distributor with an even radial flow distribution, with an even circumferential flow distribution, and with a ratio of circumferential momentum to axial momentum of less than about 0.2. The boiler has a fuel nozzle positioned adjacent the upstream end of the shell for introducing fuel into the combustion zone of the hollow interior of the shell along the centerline and downstream from the flow distributor. Further, the boiler includes a tube assembly mounted in the combustion zone and post-combustion zone of the hollow interior of the shell for transferring heat to fluid flowing through the assembly. The tube assembly has an upstream inner diameter surrounding the combustion zone and a downstream inner diameter surrounding the post-combustion zone. The downstream inner diameter is smaller than the upstream inner diameter. The boiler also has a flue duct connected to the shell adjacent the downstream end for transporting flue gases from the hollow interior.

In yet another aspect, the present invention includes a method of processing carbon-based byproducts when burning carbon-containing fuel. The method comprises cooling flue gas discharged from the final boiler in a series of pressurized boilers using boiler feed water to a temperature selected to prevent acid condensation. The cooled flue gas is filtered and fed into a top of a direct contact cooler at a rate selected to promote rate-limiting reactions. The method also includes introducing filtered flue gas through a bottom of the direct contact cooler to remove $SO_2$ and $NO_x$ by conversion to dilute sulfuric and nitric acid.

In a final aspect, the present invention includes a method of reducing carbon-based byproducts when burning carbon-containing fuel. The method comprises introducing an oxidizer to an upstream boiler and introducing carbon-containing fuel to the upstream boiler. The oxidizer and carbon-containing fuel are burned in the upstream boiler. Flue gas emitted from the upstream boiler is transported to a downstream boiler. The method also includes introducing the flue gas to the downstream boiler for use as an oxidizer and introducing carbon-containing fuel to the downstream boiler. The flue gas and carbon-containing fuel are burned in the downstream boiler.

Other aspects of the present invention will be apparent in view of the following description and claims.

BRIEF DESCRIPTION OF THE DRAWINGS

Corresponding reference characters indicate corresponding parts throughout the drawings.

DETAILED DESCRIPTION OF THE DRAWINGS

Figure 1:
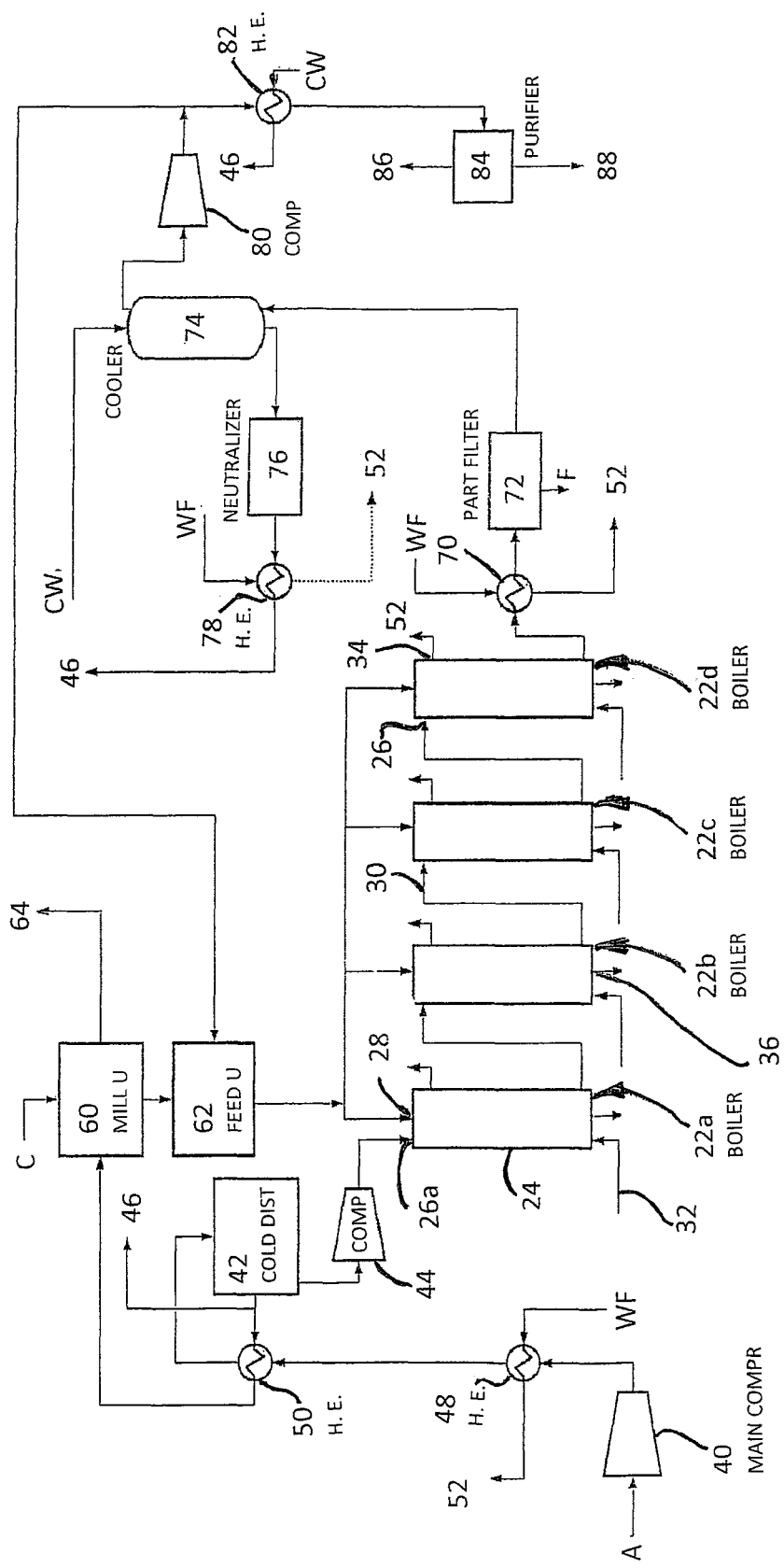
FIG. 1 is a schematic of a system for heating working fluid of one embodiment.

Referring to FIG. 1, a boiler system, more broadly a working fluid heater system, incorporating one embodiment of the present invention is designated in its entirety by the reference number 20. The system 20 includes a plurality of boilers, generally designated 22. In the illustrated system 20, four boilers 22a-d are used. (System components are identified generally by number, and by number followed by an alphabetic character corresponding to its position in series when identified specifically.) Each boiler 22 includes a shell 24 having an oxidizer inlet 26 through which pressurized oxidizer enters the boiler and a fuel inlet 28 through which fuel enters the boiler. The mixture of oxidizer and fuel is burned in the boiler. A flue duct 30 connected to each boiler 22 allows discharge of flue gas resulting from combustion. Each boiler 22 also includes a working fluid inlet 32 and a working fluid outlet 34. Working fluid is discharged from the outlet 32 at a higher temperature than when entering the boiler 22 through the inlet 30. Working fluid enters each boiler 22 through its respective working fluid inlet 32 and exits each boiler 22 through its outlet 34 where it is directed to the steam cycle. Further, each boiler 22 has an ash discharge 36 through which bottom ash is removed from the boiler. The boilers 22 are joined in series so that flue gas from the immediately upstream boiler enters the oxidizer inlet 26 of each boiler downstream from the first boiler. Thus, oxygen ($O_2$) is used as a principle component of an oxidizer in the first boiler 22a in the series, but flue gas from the immediately upstream boiler is used as the oxidizer in each subsequent boiler 22b-d. For example, flue gas from boiler 22b is directed to the oxidizer inlet 26c of boiler 22c. Although all the oxygen is delivered to the first boiler 22a in the described embodiment, some oxygen may be needed in the other boilers for flame stabilization. In general, each boiler may have multiple inlet ports to allow the injection of other gases, for example recycled flue gas to control temperature or heat transfer rate.

Although other technology may be used, in one embodiment air A is directed to an air separation unit having a main air compressor 40 and a cold distillation box 42, which separates oxygen from other air components. In the described embodiment, nearly pure oxygen exiting the separation unit 42 is directed through a second compressor 44 before being directed to the oxidizer inlet 26a of the first boiler 22a. In another embodiment, an alternative air separation unit incorporating pumped liquid oxygen may be used, in which case oxygen leaving the cold distillation box 42 is pressurized and a second compressor 44 is not required. In the first described embodiment, residual air components (i.e., mostly nitrogen ($N_2$)) exit the separation unit 42 and are directed to a conventional cooling tower 46. Heat exchangers or economizers 48, 50 are provided between the main air compressor 40 and the air separation unit 42. Boiler feed water, more broadly working fluid, WF passes through the first heat exchanger 48 where is heated by the compressed air for use in the steam cycle 52. Some of the residual air components are directed through the second heat exchange 50 for use in coal milling. Other technologies for producing $O_2$, such as membrane air separation, may also be used without departing from the scope of the present invention. As will be appreciated by those skilled in the art, using nearly pure $O_2$ in the boilers 22 and eliminating $N_2$ and other residual air components, the flue gas is primarily $CO_2$ after the $O_2$ is burned in the last boiler 22d and residual water and remaining contaminants are removed.

Coal, more broadly fuel, C enters a coal milling unit 60 where it is pulverized to a predetermined size for use in the boilers 22a-d. In the described embodiment, the residual air components directed to the coal milling unit 60 from the air separation unit 42 are used by the milling unit as will be understood by those skilled in the art. Coal exiting the milling unit 60 is directed to coal feeding unit 62 which feeds a predetermined amount of milled coal to each fuel inlet 28a-d of the boilers 22a-d. The air components used by the milling unit 60 are exhausted through a vent 64. Although other flow rates of milled coal C may be delivered to the boilers 22 without departing from the scope of the present invention, in one embodiment, about 17.4 kg/s of milled coal is delivered through the fuel nozzle 106 of the first boiler 22a and about 20.52 kg/s of milled coal is delivered through the fuel nozzles of each subsequent boiler 22b-22d in the series. Although fuel may be delivered to the boilers using other means, in one embodiment the feeding unit 62 is a pneumatic dry feeder using a small amount of recycled flue gas as motive gas. Other feeding techniques, such as a dry solids pump, which are capable of delivering dry coal at up to 40 bar without motive gas and slurry feed may also be used without departing from the scope of the present invention.

Flue gas discharged from the final boiler in the series 22d, is directed to a heat exchanger 70 where it is cooled using boiler feed water WF. Although other types of heat exchangers may be used, in one embodiment the heat exchanger 70 is a convective heat exchanger. The resulting heated boiler feed water WF is directed to the steam cycle, and the cooled flue gas is directed to a particulate filter 72 and then to a direct contact cooler or condenser 74 where the flue gas is scrubbed to remove sulfur oxides (SOx) and other contaminants. The temperature of the flue gas exiting the heat exchanger 70 may be selected to prevent acid condensation downstream. The particulate filter 72 (e.g., a candle filter) separates fly ash F from the flue gas. Both cooling and moisture condensation occur in the direct contact cooler 74. Cooling water flows through the cooler 74 from the top, and flue gas from the bottom. The cooler performs a dual role. The first is to cool and condense the moisture from the flue gas, which occurs in the bottom stages. The second is to remove $SO_x$ and $NO_x$, via conversion to dilute sulfuric and nitric acid, which is performed in the top stages. The system 20 is expected to remove almost all of the $SO_2$ and $NO_x$ as the boilers 22 can produce higher $NO_x$ than in a conventional oxy-combustion system (due to the high local flame temperatures) and hence has a lower $SO_x/NO_x$ ratio, which is believed to provide higher efficiency $SO_x$ and $NO_x$ removal. Mercury present in the flue gas can also be removed in the same cooler 74 either via dissolution or reaction. Although multiple columns may be used without departing from the scope of the present invention, in one embodiment the cooler 74 is formed as a single column to minimize equipment exposed to corroding acids. Further, the flow rates of the liquid in the column and the column height may be adjusted to allow the top stages of the cooler 74 to be at low temperature, promoting the overall rate-limiting reaction, while allowing most of the cooling and condensation to occur in the bottom stages. Among the advantages of this cooler 74 over others are: 1) the capture of SOx and NOx simultaneously, which is more economical as compared to separate removal process such as selective catalytic reduction (SCR) for NOx removal and sorbent injection for SO2; 2) large pieces of equipment are eliminated, resulting in significant capital cost savings; and 3) acid gas condensation is controlled to occur only in one column, eliminating the chances of corrosion in other parts of the system.

The contaminants scrubbed from the flue gas by the cooler 74 are directed to a neutralizer 76, which uses caustic or other neutralizing agents to adjust acidity of the contaminants, before being directed to a heat exchanger 78 for further cooling. The cooling water used in the direct contact cooler 74 for cooling and condensation exits the bottom of the cooler at relatively high temperature (e.g., about 165° C.) with some acid concentration (e.g., about 730-4000 ppmv. After neutralization, the water is passed through a heat exchanger (e.g., an indirect heat exchanger) for regeneration of low temperature fluid. This heat, in conjunction with the low-grade heat that is available from the air separation unit 42, greatly reduces or eliminates (depending on the fuel) the need for steam extraction from a low pressure turbine in the steam cycle, allowing for higher gross power generation.

The cooled contaminants are directed to the cooling tower 46. Boiler feed water WF passing through the heat exchanger is heated and directed to the steam cycle. The direct contact cooler 74 is connected to cooling water CW for condensing the flue gas. The treated flue gas is directed through a compressor 80 before being recycled through the coal feeding unit 62 and onward to the fuel inlets 28 of the boilers 22. Some of the flue gas passes through a heat exchanger 82 where it is cooled with cooling water CW. The cooling water CW is discharged to the cooling tower 46, and the cooled flue gas is directed to a compression and purification unit 84. Purified fluid gas exhausts through a vent 86 in the purification unit 84, and contaminant residues are directed to sequestration area 88. Although the unit 84 may be selected to operate at other pressures, in one embodiment the unit 84 operates at a pressure of about 35 bar. A small fraction (e.g., about 3-5%) of this compressed, dry flue gas is recycled back for carrying the coal in a dense phase. The majority (e.g., >95 vol %) is sent to the unit after passing through molecular sieves (not shown) for further moisture removal, and a bed of an activated carbon (not shown) for removal of residual mercury in the gas. The purification unit 84 in one embodiment uses cryogenic distillation to purify the $CO_2$ to the desired specification. In one embodiment, an auto-refrigeration unit 84 is used.

Only a small fraction of the flue gas is recycled through the boilers 22. In general, eliminating flue gas recycle results in a dramatic increase in temperature of the combustion products and the rate of radiant heat transfer, as compared to combustion in air. In some instances, the resulting temperatures and heat transfer can damage boiler tubes. As will be appreciated by those skilled in the art, these damaging temperatures and heat transfer rates are avoided by using a plurality of boilers in series, staging fuel delivery, and controlling mixing of fuel and oxidizer in the boilers.

In a conventional boiler, slightly more (e.g., about 15%) oxygen is supplied than required to completely burn the fuel. In the multi-boiler system described above, the first boiler 22a in the series is over-supplied with oxygen to achieve a stoichiometric ratio (i.e., the ratio of $O_2$ supplied to $O_2$ needed for complete combustion) of about 4. The excess $O_2$ acts as a diluent that reduces the temperature of the combustion products and heat transfer. Heat is extracted from the first boiler 22a and is transferred to the steam cycle where the flue gas temperature is reduced. The products of combustion from the first boiler 22a, including the excess $O_2$, are directed to the second boiler 22b where additional fuel is injected and more $O_2$ is consumed. This process continues in the third and fourth boilers 22c, 22d until nearly all of the $O_2$ is consumed. Rather than supplying all the fuel to one boiler, part of the fuel is supplied to each boiler in the series. The total gas flow rate in this process is equivalent to a boiler in which only enough oxygen to burn the fuel is used. When multiple boilers in series are used, dilution is available in a local sense in each boiler to control temperatures and heat transfer. As a result, the amount of heat transfer may be increased while maintaining the temperatures at acceptable levels.

Figure 2:
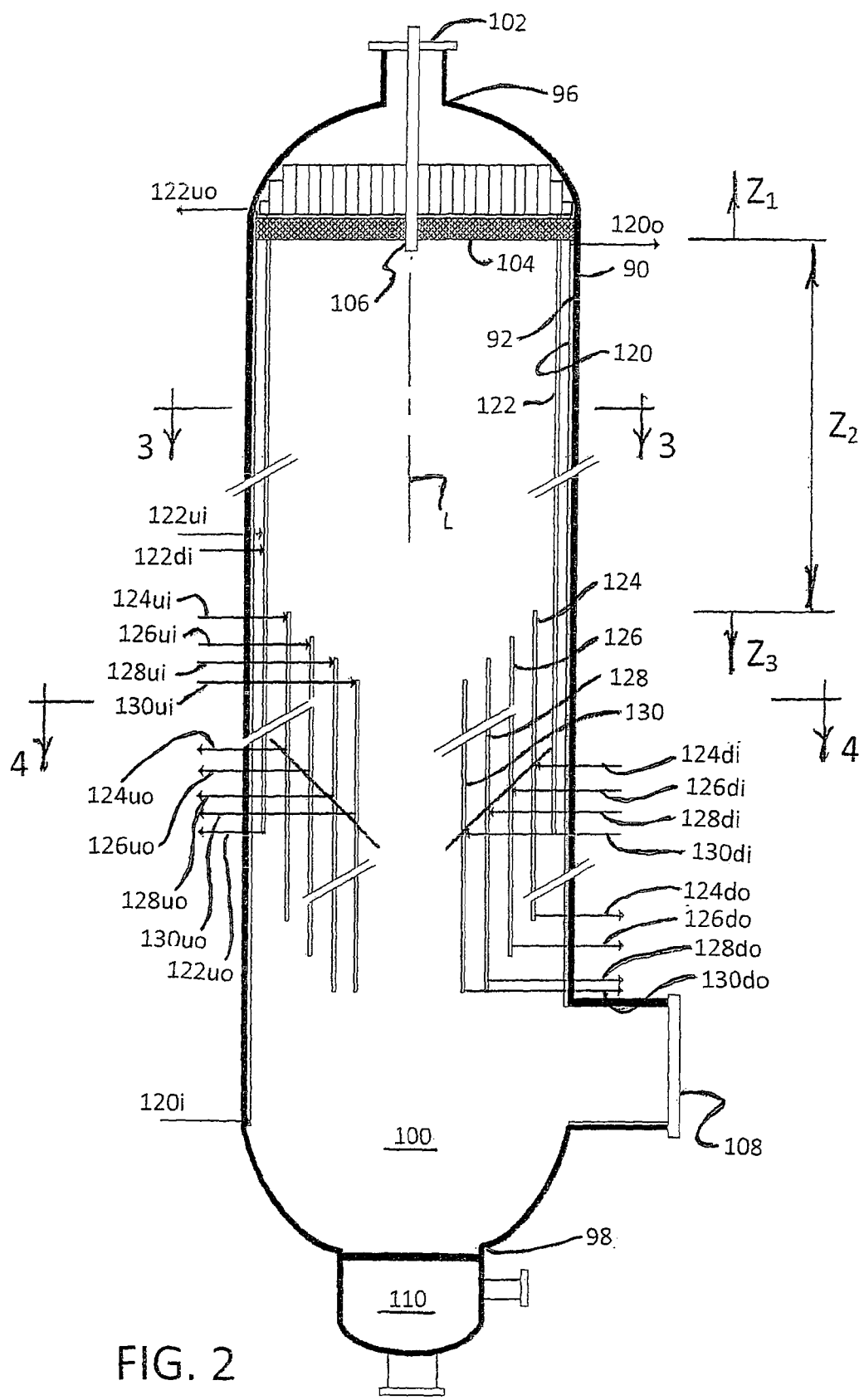
FIG. 2 is a schematic of a vertical cross section of a working fluid heater of one embodiment.

As illustrated in FIG. 2, a boiler, more broadly a working fluid heater, incorporating a first embodiment of the present invention is designated in its entirety by the reference number 22. This boiler is representative of the plurality of boilers 22 joined in series in FIG. 1. As further shown in FIG. 2, the boiler 22 includes an elongate cylindrical shell 90 surrounding a vertical centerline L. The shell 90 has an inner surface 92 having an inner diameter and an inner length extending between an upper upstream end 96 and a lower downstream end 98. Although the inner diameter and length of the shell may vary without departing from the scope of the present invention, in one embodiment the shell has an inner diameter of about 13 ft to about 15 ft and a length of about 240 ft. Further, in one embodiment, the diameter tapers from about 15 ft at the upper end 96 to about 13 feet at the lower end 98. The inner surface 92 of the shell 90 defines a hollow interior 100 having a pre-combustion zone $Z_1$, a combustion zone $Z_2$ downstream from the pre-combustion zone, and a post-combustion zone $Z_3$ downstream from the combustion zone. The shell 90 forms a pressure vessel capable of withstanding anticipated pressures achieved in the process. An oxidizer inlet 102 enters the pre-combustion zone $Z_1$ of the hollow interior 100 adjacent the upstream end 96 of the shell 90. A flow distributor 104 is mounted in the hollow interior 100 of the shell 90 downstream from the oxidizer inlet 102. The flow distributor 104 is selected to provide a sufficiently high pressure drop that oxidizer downstream from the distributor has an even radial flow distribution, an even circumferential flow distribution, and a ratio of circular momentum to axial momentum of less than about 0.2. The shell 90 also has a fuel nozzle 106 positioned adjacent the upstream end 96 for introducing fuel into the combustion zone $Z_2$ of the hollow interior 100 of the shell along the centerline L and downstream from the flow distributor 104. The fuel injected into the interior 100 through the nozzle 106 along the center axis and the low mixing between the oxidizer and fuel creates a long combustion zone $Z_2$ and a thin flame, which reduces heat transfer rates at the shell 90. An outlet 108 leading to a flue duct 30 (FIG. 1) is provided in the side of the shell 90 adjacent the downstream end 98 for transporting flue gas from the hollow interior 100. An ash and condensate trap 110 is provided at the bottom of the boiler 22 for collecting bottom ash and water.

Figure 3:
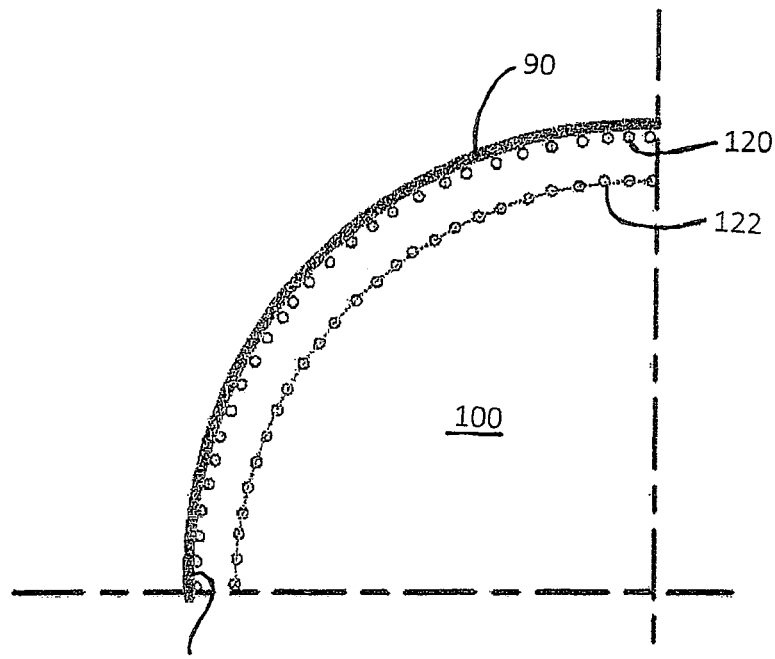
FIG. 3 is a partial cross section taken in the plane of line 3-3 of FIG. 2.
Figure 4:
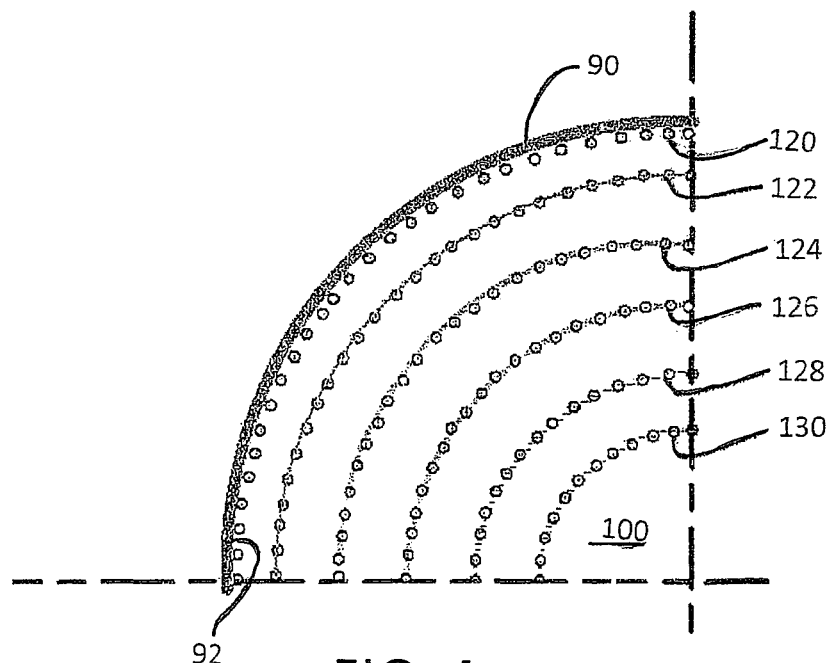
FIG. 4 is a partial cross section taken in the plane of line 4-4 of FIG. 2.

As illustrated in FIGS. 2-4, the boiler 22 has several tube assemblies 120-130 comprising tubes extending axially with respect to the centerline L. The tube assemblies 120-130 are mounted in the combustion zone $Z_2$ and post-combustion zone $Z_3$ of the hollow interior 100 of the shell 90 for transferring heat primarily by radiation heat transfer from combusting fuel adjacent the centerline L to working fluid flowing through the assemblies. Tube assemblies 120 and 122 extend from the flow distributor 104, through the combustion zone $Z_2$ to absorb radiant heat provided by flame in the combustion zone and shield the shell 90 from the flame. These tube assemblies 120, 122 extend into the post-combustion zone $Z_3$, to supplement heat transfer provided by tubes 124-130, which extend through the post-combustion zone $Z_3$. In order to prevent the tubes in tube assemblies 120 and 122 from overheating, they are positioned at larger diameters than the other tube assemblies 124-130. For example, in one embodiment tube assembly 120 is positioned at a diameter of about 14.9 ft, tube assembly 122 is positioned at about 13 ft, tube assembly 124 is positioned at about 10.6 ft, tube assembly 126 is positioned at about 8.2 ft, tube assembly 128 is positioned about 5.6 ft, and tube assembly 130 is positioned at about 3 ft. Further, the tubes 120-130 are positioned in the shell 90 with their upstream ends at different axial locations with respect to the flow distributor 104. For example, in the aforementioned embodiment tube assemblies 120 and 122 have upstream ends that are positioned upstream from the flow distributor 104, the upstream end of tube assembly 124 is positioned at about 175 ft downstream from the flow distributor, tube assembly 126 is positioned at about 185 ft, tube assembly 128 is positioned about 195 ft, and tube assembly 130 is positioned at about 205 ft. The tube assemblies 120-130 also have different lengths. In the same embodiment, tube assembly 120 is about 237 ft long, assembly 122 is about 198 ft, assembly 124 is about 23 ft, tube assembly 126 is about 41 ft, tube assembly 128 is about 55 ft, and tube assembly 130 is about 62 ft.

Tube assembly 120 has an inlet $120_i$ at its downstream end and an outlet $120_o$ at its upstream end. Cooling water CW is transported the tube assembly 120 to form a tube liner that shields the shell 90 from heat generated by the burning fuel. In one embodiment, the cooling water CW remains at a temperature below about 294° C. at the outlet $120_o$ to prevent damage to the shell 90. Each assembly 122-130 is divided into an upstream or superheater portion $122_u$-$130_u$, respectively, and a downstream or reheater portion $122_d$-$130_d$, respectively. Each upstream portion $122_u$-$130_u$ forms a superheater unit having an inlet $122_{ui}$-$130_{ui}$, respectively, at its downstream end and an outlet $122_{uo}$-$130_{uo}$, respectively, at its upstream end. Each downstream portion $122_d$-$130_d$, forms a reheater unit having an inlet $122_{di}$-$130_{di}$, respectively, at its upstream end and an outlet $122_{do}$-$130_{do}$, respectively, at its downstream end. As will be appreciated by those skilled in the art, the positions of the various tube assembly inlets $120_i$, $122_{ui}$-$130_{ui}$, $122_{di}$-$130_{di}$ and outlets $120_o$, $122_{uo}$-$130_{uo}$, $122_{do}$-$130_{do}$ are selected so the assemblies 120-130 provide working fluid of a selected temperature. For example, in the previously mentioned embodiment, the fluid entering tube assembly inlet $122_{ui}$ is about 294° C. and is heated so it exits the upper portion tube assembly outlet $122_{uo}$ at about 384° C. Fluid entering the remaining upstream portions of the tube assembly inlets $124_{ui}$-$130_{ui}$ at about 384° C. and is heated so it exits the corresponding tube assembly outlets $124_{uo}$-$130_{uo}$ at about 593° C. Similarly, fluid entering tube assembly inlet $122_{di}$ is about 384° C. and is heated so it exits the upstream portion tube assembly outlet $122_{do}$ at about 593° C. Fluid entering the remaining downstream portions of the tube assembly inlets $124_{di}$-$130_{di}$ at about 352° C. and is heated so it exits the corresponding tube assembly outlets $124_{do}$-$130_{do}$ at about 593° C. The various fluid temperatures are selected to provide working fluid at advantageous temperatures for use in other parts of the system as explained below.

Figure 5:
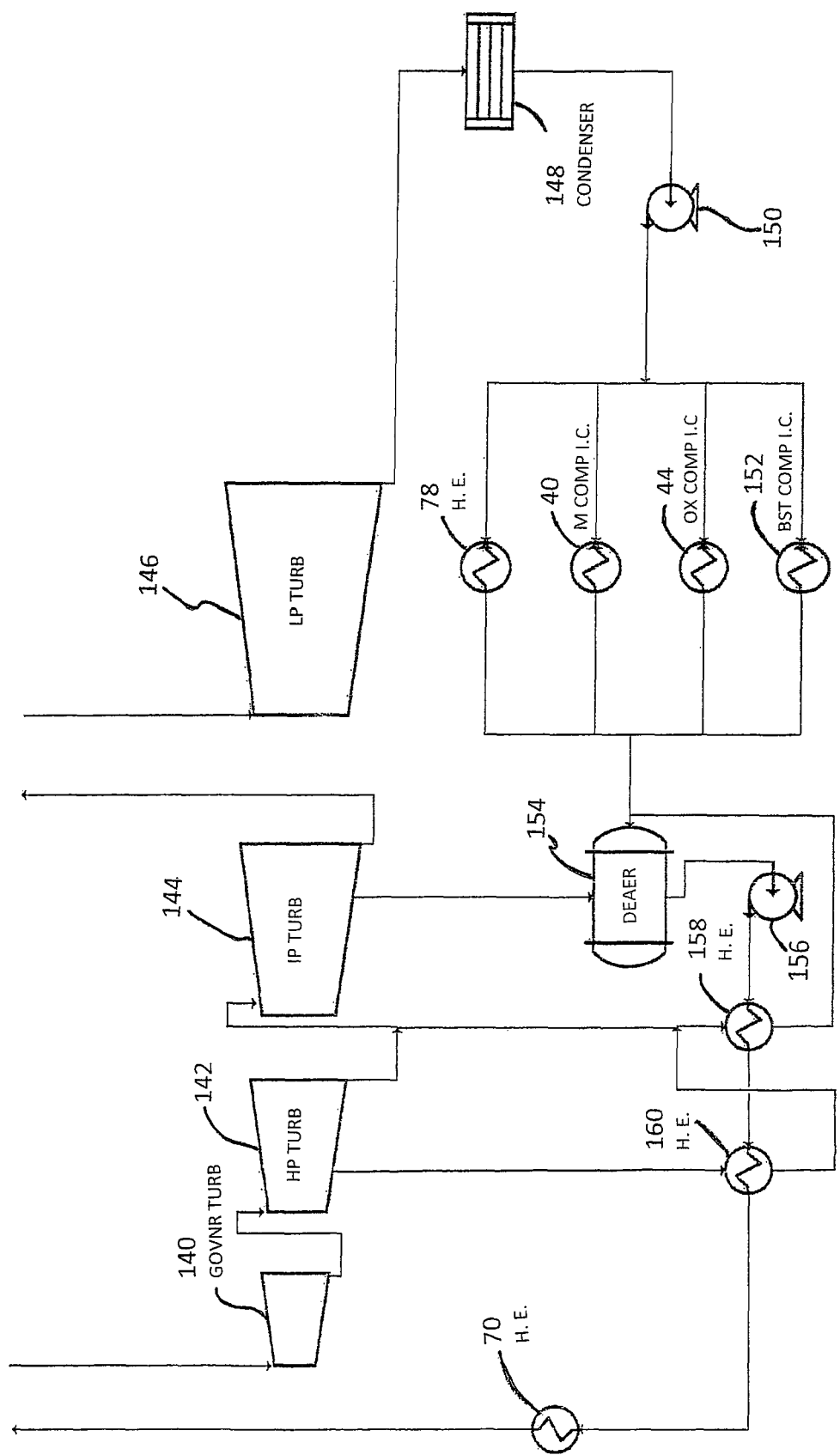
FIG. 5 is a schematic of a working fluid cycle of one embodiment.

As shown in FIG. 5, the steam cycle 58 includes one or more turbines having a governing stage 140, a high pressure stage 142, an intermediate pressure stage 144, and a low pressure stage. Working fluid is directed from the outlets of the upstream portions of tube assemblies $122_{uo}$-$130_{uo}$ to the governing stage 140 and onward to the high pressure stage 142. The high pressure stage 142 feeds steam to the intermediate stage 144. Steam exiting the intermediate stage 144 is directed to the inlets of the downstream portions of tube assemblies $122_{di}$-$130_{di}$ for reheating before returning to the low pressure stage 146. After exiting the low pressure stage 146 of the turbine, the working fluid is directed to a condenser 148. Although other condensers may be used, in one embodiment, the condenser 148 is selected to have a pressure of 0.048 bar and a terminal temperature difference of 11.7° C. A pump 150 is provided for pumping fluid from the condenser 148. The fluid is pumped to the heat exchanger 78 and used as the cooling water CW for condensing the flue gas with the heat exchanger 82 as previously explained. The fluid is also pumped to intercoolers in the main air compressor 40, the oxygen air compressor 44, and a booster air compressor 152.

As further illustrated in FIG. 5, working fluid is bled from the intermediate stage 144. This fluid passes through a deaerator 154 to remove oxygen and other dissolved gases from the fluid. Used cooling fluid from the heat exchanger 78, and the intercoolers in the main air compressor 40, the oxygen air compressor 44, and the booster air compressor 152 are also fed through the deaerator 154. A pump 156 is provided for pumping fluid from the deaerator 154 through heat exchangers 156, 160, 70, sequentially, and on to the inlets of the upstream tube assemblies $122ui$-$130ui$. Fluid in these tube assemblies is heated and returned from the outlets of the upstream portions of tube assemblies $122_{uo}$-$130_{uo}$ to the governing stage 140. Fluid bled from the high pressure stage 142 is directed through heat exchangers 158, 160 to heat the fluid before reaching the heat exchanger 70. The bleed fluid passing through heat exchanger 160 is mixed with bleed fluid entering heat exchanger 158, and the bleed fluid exiting the heat exchanger 158 is directed to the deaerator 154 where it mixes with the other fluid entering the deaerator. As will be apparent to those skilled in the art, heat generated from the compression of air is integrated with the steam cycle and used for boiler feed water regeneration.

The system 20 described above is used to heat working fluid by burning carbon-containing fuel in pressurized boilers or working fluid heaters 22. An oxidizer (e.g., $O_2$, or $O_2$ and flue gas) and carbon-containing fuel is introduced to an upstream boiler (e.g., 22a or 22b) The oxidizer and carbon-containing fuel is burned in the upstream boiler, and the flue gas emitted from the upstream boiler is transported to a downstream boiler (e.g., 22b or 22c). The flue gas is introduced to the downstream boiler for use as an oxidizer. Carbon-containing fuel is introduced to the downstream boiler, and the flue gas and carbon-containing fuel are burned in the downstream boiler. The oxidizer is introduced into the respective boiler through a flow distributor 104 so the oxidizer enters the boiler with circumferentially and axially even distributions. The distributor 104 further ensures the oxidizer has a ratio of circular momentum to axial momentum of less than about 0.2. Heat exchangers 122-130 are provided in each boiler 22 to heat working fluid by passing it through the heat exchanger when burning the oxidizer and carbon-containing fuel. In some embodiments, heat exchangers 124-130 are divided so they provide a superheater unit and a reheater unit.

The system uses an air separation unit 42 for separating oxygen from air. The separated oxygen is delivered to the upstream boiler (e.g., boiler 22a) for use as the oxidizer. Although other flow rates of oxygen may be delivered without departing from the scope of the present invention, in one embodiment about 120 kg/s of oxygen are delivered through the oxidizer inlet 102 into the hollow interior 100 of the shell 90 of the first boiler 22a in the series. After the flue gas is emitted from the final boiler, it is filtered to separate fly ash from the flue gas. The filtered flue gas is scrubbed by the direct contact cooler 74 to remove sulphur oxides and nitrogen oxides. The cooler 74 also cools the flue gas.

The portion of the system shown in FIG. 5 expands working fluid emitted by each boiler 22 with a multi-stage turbine. Working fluid from the superheater unit is delivered to the highest pressure stage (e.g., governing stage 140). Working fluid emitted from an intermediate stage (e.g., stage 144) is delivered to the reheater unit. Once heated by the reheater unit, the working fluid is delivered to a lower pressure stage (e.g., stage 146) where the fluid is expanded. Fluid leaving the lowest pressure stage (e.g., stage 146) is delivered to one or more heat exchangers where it is heated and returned to the boilers 22 for heating.

Several variables should be considered when selecting the boiler operating pressures. First, flue gas moisture condensation as a function of pressure and temperature should be considered. Second, the pressure needed for effective removal of $SO_2$ and $NO_x$. Third, in order to transfer most of the heat extracted at the direct contact cooler 76 to the cold boiler feed water for regeneration while maintaining the minimum approach temperature in the regenerator, the pressure should be high enough to transfer the heat to the boiler feed water without violating the minimum temperature approach. Fourth, fluid mechanics should also be considered. As these considerations are well within the skill of the ordinary artisan, they will not be discussed in detail.

The process described above uses combustion of carbon-based fuels (e.g., coal) for supplying high temperature and pressure working fluid (e.g., steam) for generating power. Carbon dioxide ($CO_2$) produced during the process is captured and prevented from being emitted to the atmosphere.

For more information concerning the system and process described above, reference may be made to Axelbaum, et al., "Process Design and Performance Analysis of a Staged, Pressurized Oxy-Combustion (SPOC) Power Plant for Carbon Capture", Applied Energy, volume 125, pages 179-188 (Jul. 15, 2014), and Axelbaum, et al., "Phase I Topical Report: Staged, High-Pressure Oxy-Combustion Technology: Development and Scale-Up", DOE Award Number DE-FE0009702 (issued Jun. 28, 2013), both of which are hereby incorporated by reference.

The system 20 and process described above provide several advantages. Fuel staging allows a large degree of control over radiative heat transfer in the boiler. By controlling the mixing and the local ratios of fuel and oxygen, the combustion temperature and radiation can be manipulated. Furthermore, by introducing the fuel in stages, the overall length of the radiative section can be lengthened, allowing more heat to be transferred by radiation, as opposed to convection. Because the rate of heat transfer is higher for radiation than convection, staged combustion minimizes the required boiler tube surface area, reducing capital costs. In addition, fuel staging allows increased control over radiative heat transfer in the boiler. By controlling the mixing and the local ratios of fuel and oxygen, the combustion temperature and radiation can be manipulated. Furthermore, by introducing the fuel in stages, the overall length of the radiative section can be increased.

The system 20 and process described above produces high local temperature but controlled heat transfer rates, potentially leading to higher levels of NOx and thus a more effective process for combined $SO_x$ and $NO_x$ removal. This increases efficiency and significantly reduces capital costs over scrubbing approaches for SOx removal.

Eliminating flue gas recycle potentially reduces the size of the boilers, pumps, and other equipment. Heat loss to the ambient is also reduced. Importantly, the volume of gas undergoing treatment for removal of ash and other contaminants is reduced, and the concentrations of these contaminants is increased, making their removal easier and more cost effective. Further, flue gas recirculation accounts for a significant amount of parasitic power demand (about 3.5-5% of the plant electrical output) in conventional pressurized oxy-fuel systems. By eliminating recycled flue gas, losses associated with recycle and the equipment for transporting the recycled gas are avoided. Thus, efficiencies are higher and capital costs are lower.

Some low rank fuels, such as lignite, have limited use due to their very high moisture content, making them difficult to ignite or combust in air because moisture evaporation lowers flame temperature and delays volatile release. Using pure oxygen results in a higher flame temperature near the burner and improved stability, making low rank fuels easier to burn. Further, since much of the latent heat in the flue gas can be captured in pressurized combustion, the effective heating value of "low-Btu" fuels can be significantly increased.

In brief, the primary benefits of pressurized oxy-combustion include: 1) The moisture in the flue gas condenses at higher temperature, and thus the latent heat of condensation can be utilized to improve the overall cycle efficiency; 2) the gas volume is greatly reduced, therefore the size and cost of equipment can be reduced; 3) air ingress, which normally occurs in induced-draft systems, is avoided, thereby increasing the CO2 concentration of the combustion products and reducing purification costs; and 4) at higher pressure, the convective heat transfer to boiler tubes is increased, for a given mean velocity. This is due to the increase in flue gas density with pressure, and therefore increased Reynolds number and convective heat transfer coefficient.

Having described the invention in detail, it will be apparent that modifications and variations are possible without departing from the scope of the invention defined in the appended claims.

When introducing elements of the present invention or the preferred embodiment(s) thereof, the articles "a", "an", "the", and "said" are intended to mean that there are one or more of the elements. The terms "comprising", "including", and "having" are intended to be inclusive and mean that there may be additional elements other than the listed elements.

As various changes could be made in the above constructions, products, and methods without departing from the scope of the invention, it is intended that all matter contained in the above description and shown in the accompanying drawings shall be interpreted as illustrative and not in a limiting sense.

What is claimed is:

1. A method of reducing carbon-based byproducts when burning carbon-containing fuel, said method comprising:
   introducing an oxidizer to an upstream boiler;
   introducing carbon-containing fuel to the upstream boiler;
   burning the oxidizer and carbon-containing fuel in the upstream boiler;
   transporting flue gas emitted from the upstream boiler to a downstream boiler;
   introducing the flue gas to the downstream boiler for use as an oxidizer;
   introducing carbon-containing fuel to the downstream boiler; and
   burning the flue gas and carbon-containing fuel in the downstream boiler;
   wherein each of the steps of introducing oxidizer comprises providing a circumferentially and axially even distribution of oxidizer in the respective boiler; and
   wherein each of the steps of introducing oxidizer comprises ensuring the oxidizer has a ratio of circular momentum to axial momentum of less than 0.2.

2. The method of claim 1, wherein:
   the upstream boiler is a first boiler;
   the downstream boiler is a second boiler; and
   the method further comprises:
      transporting flue gas emitted from the second boiler to a third boiler;
      introducing the flue gas from the second boiler to the third boiler for use as an oxidizer;
      introducing carbon-containing fuel to the third boiler; and
      burning the flue gas and carbon-containing fuel in the third boiler.

3. The method of claim 2, further comprising:
   transporting flue gas emitted from the third boiler to a fourth boiler;
   introducing the flue gas from the third boiler to the fourth boiler for use as an oxidizer;
   introducing carbon-containing fuel to the fourth boiler; and
   burning the flue gas and carbon-containing fuel in the fourth boiler.

4. The method of claim 1, further comprising:
   providing a heat exchanger in each of said boilers; and
   passing a fluid through the heat exchanger when burning the oxidizer and carbon-containing fuel thereby to heat said fluid.

5. The method of claim 4, further comprising:
   providing the heat exchanger with a superheater unit; and
   providing the heat exchanger with a reheater unit.

6. The method of claim 5, further comprising:
   delivering fluid from the superheater unit to one or more turbines;
   expanding fluid delivered from the superheater with the one or more turbines; and
   delivering fluid from the one or more turbines to the reheater unit.

7. The method of claim 5, further comprising:
   delivering fluid from the reheater unit to one or more turbines;
   expanding fluid delivered from the reheater unit with the one or more turbines; and
   delivering fluid from the one or more turbines to the heat exchanger.

8. The method of claim 1, further comprising:
   separating oxygen from air; and
   delivering the oxygen separated from air to the upstream boiler for use as the oxidizer.

9. The method of claim 1, further comprising filtering flue gas emitted by the downstream boiler to separate fly ash from the flue gas.

10. The method of claim 1, further comprising cooling flue gas emitted by the final downstream boiler.

11. The method of claim 1, further comprising scrubbing flue gas emitted by the downstream boiler to remove sulphur oxides from the flue gas.

12. The method of claim 1, wherein each of the steps of burning the oxidizer and carbon-containing fuel comprises pressurizing the respective boiler.

* * * * *